(12) United States Patent
Maeda et al.

(10) Patent No.: US 6,185,731 B1
(45) Date of Patent: **\*Feb. 6, 2001**

(54) REAL TIME DEBUGGER FOR A MICROCOMPUTER

(75) Inventors: Shohei Maeda; Nobusuke Abe; Yoshikazu Satoh, all of Hyogo (JP)

(73) Assignees: Mitsubishi Electric Semiconductor Software Co., Ltd., Hyogo; Mitsubishi Denki Kabushiki Kaisha, Tokyo, both of (JP)

(\*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/526,476

(22) Filed: Sep. 11, 1995

(30) Foreign Application Priority Data

Apr. 14, 1995 (JP) .................................................. 7-089254

(51) Int. Cl.[7] ...................................................... G06F 9/45
(52) U.S. Cl. ................................ 717/4; 703/28; 714/37
(58) Field of Search .................................. 395/500, 704, 395/183.04, 183.21, 183.06, 183.03; 714/25, 28, 29, 30, 31, 32, 33, 34, 37, 45; 717/4, 5; 703/23–28

(56) References Cited

U.S. PATENT DOCUMENTS

| 4,277,827 | \* | 7/1981 | Carlson et al. | 364/200 |
|---|---|---|---|---|
| 4,677,586 | \* | 6/1987 | Mayer et al. | 364/900 |
| 5,136,701 | \* | 8/1992 | Kawai et al. | 395/425 |
| 5,479,652 | \* | 12/1995 | Dreyer et al. | 395/183.06 |
| 5,544,311 | \* | 8/1996 | Harenberg et al. | 395/183.16 |

FOREIGN PATENT DOCUMENTS

| 60-262251 | 12/1985 | (JP) . |
|---|---|---|
| 5-334114 | 12/1993 | (JP) . |

OTHER PUBLICATIONS

Uffenbeck, "Microcomputers and Microprocessors", Prentice–Hall, 1985, pp. 273–277.\*

\* cited by examiner

Primary Examiner—Kakali Chaki
(74) Attorney, Agent, or Firm—McDermott, Will & Emery

(57) ABSTRACT

The microcomputer provides with surroundings where data in a RAM can be monitored on the outside without employing an external bus. When a command requesting accessing to a RAM is received from an external monitor, a real time debugger built in the microcomputer confirms that a CPU is not accessing the RAM, and accesses the RAM. On the other hand, when accessing to an emROM, which emulates an actual ROM, is requested from the monitor, the real time debugger accesses one of emROMs which is not being used by the CPU at present.

22 Claims, 11 Drawing Sheets

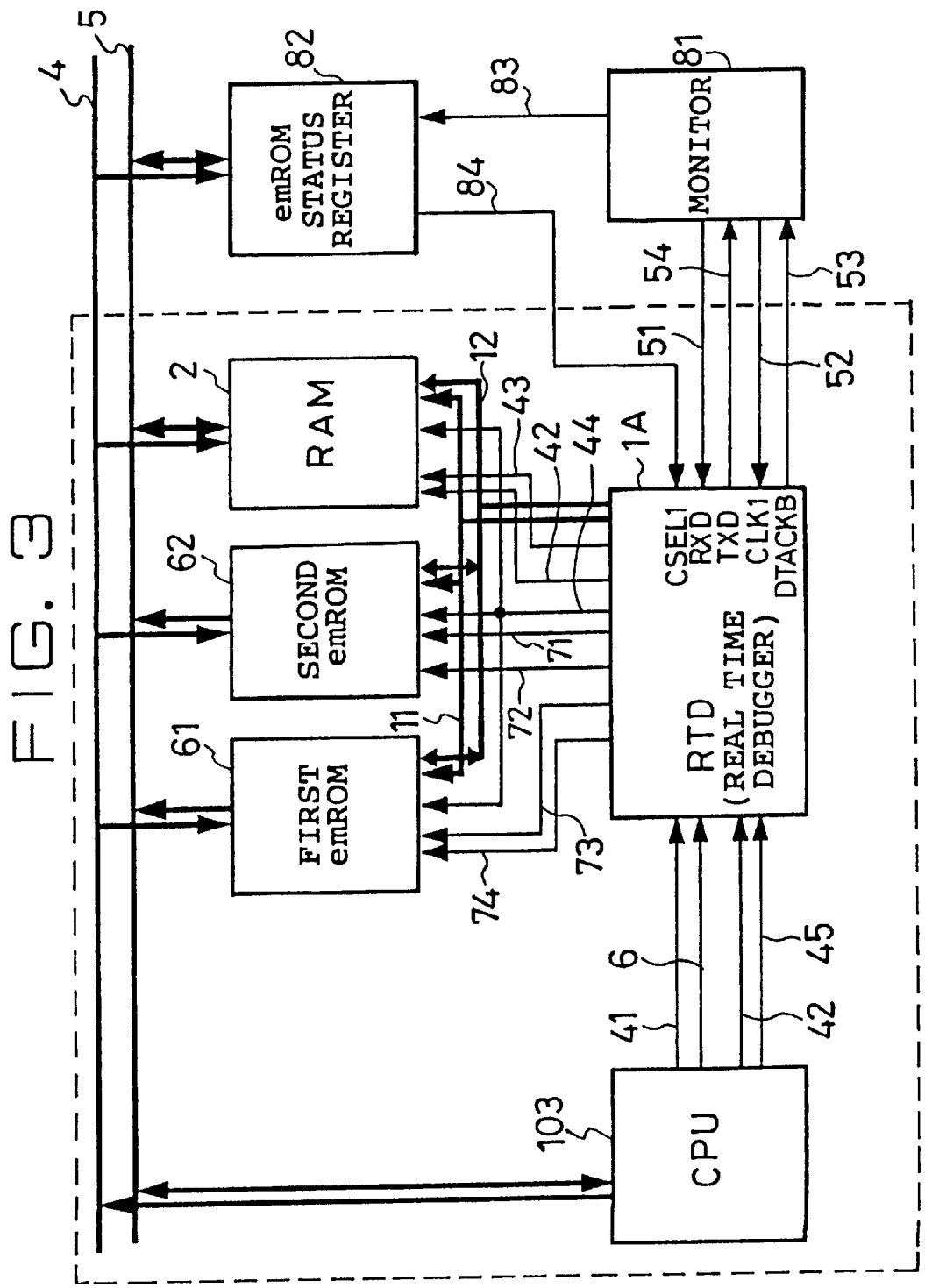

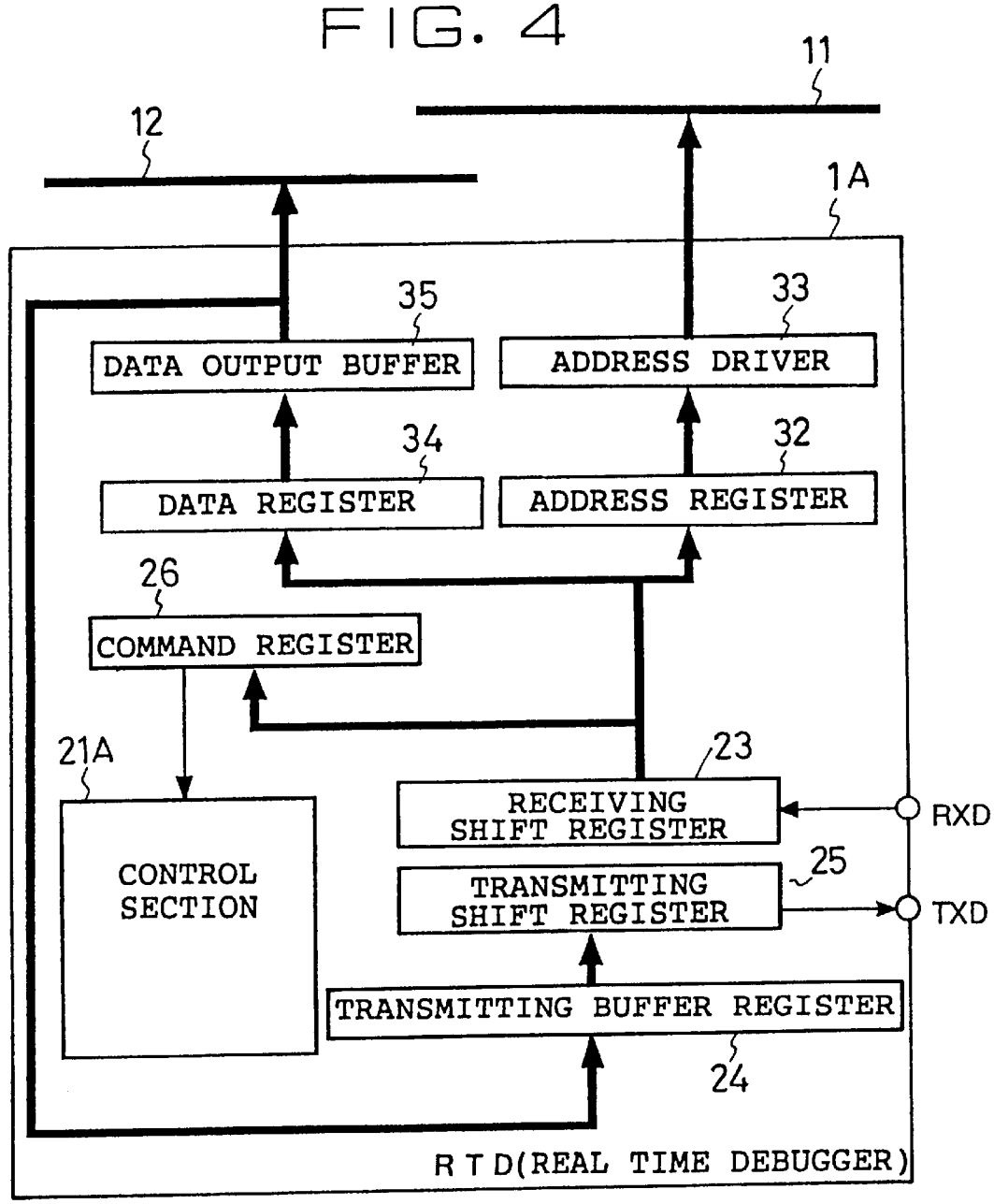

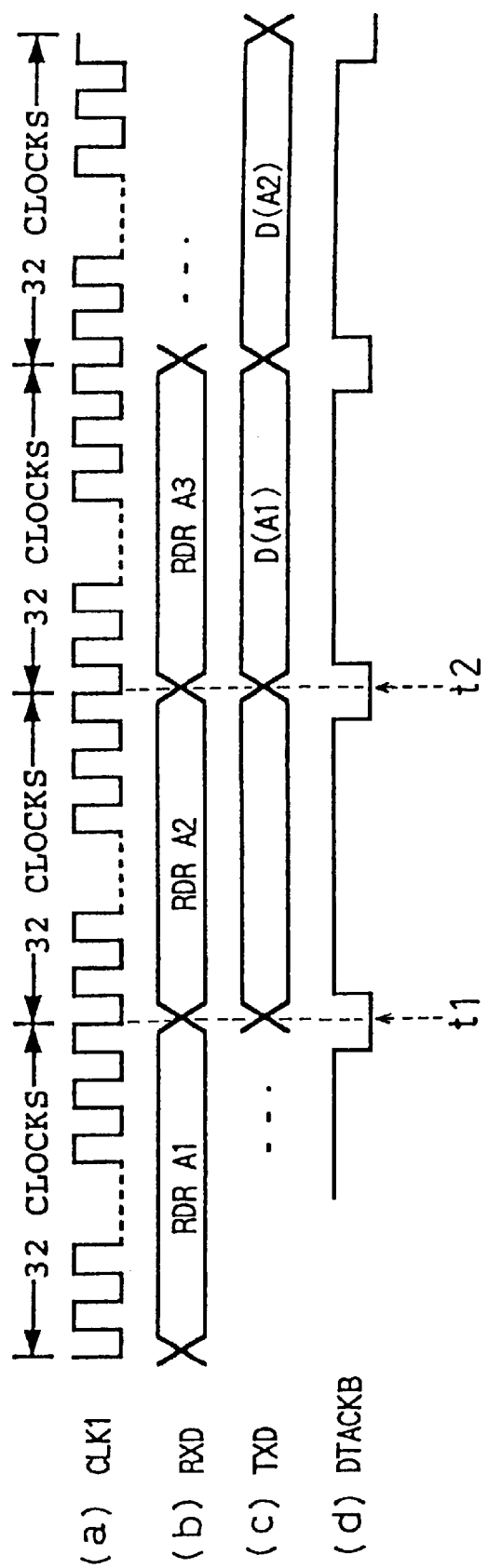

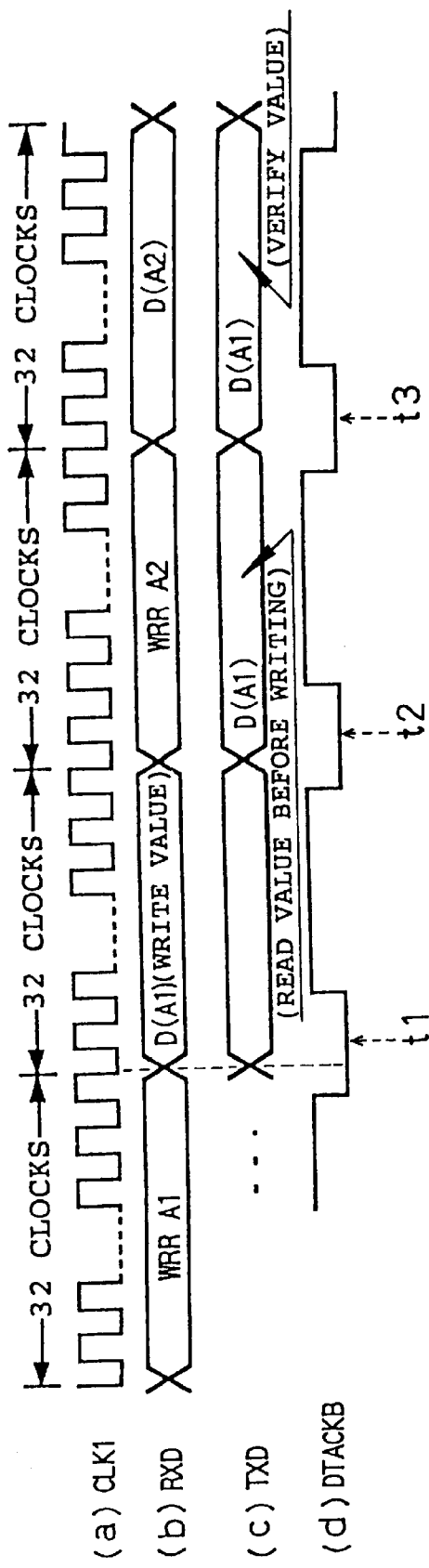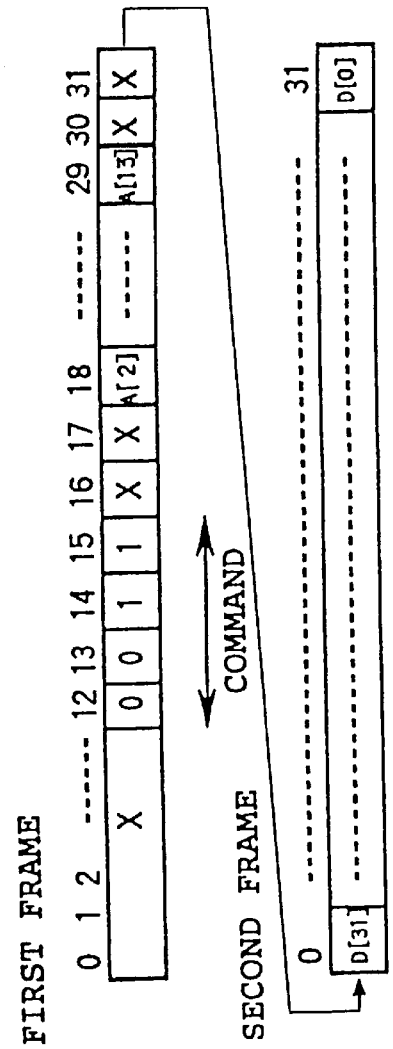

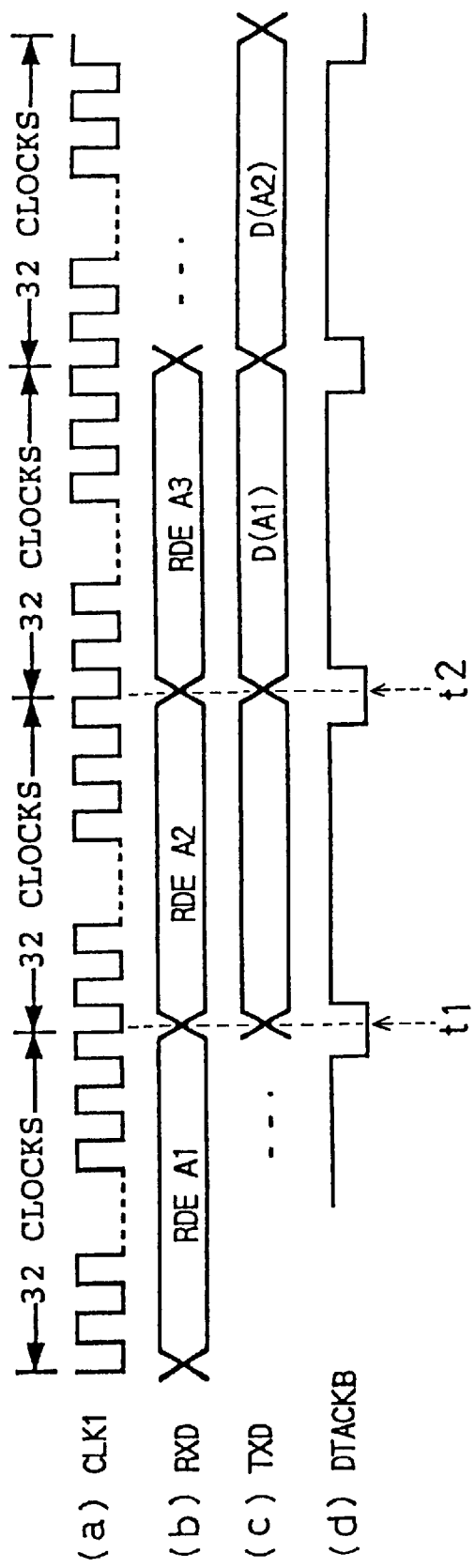

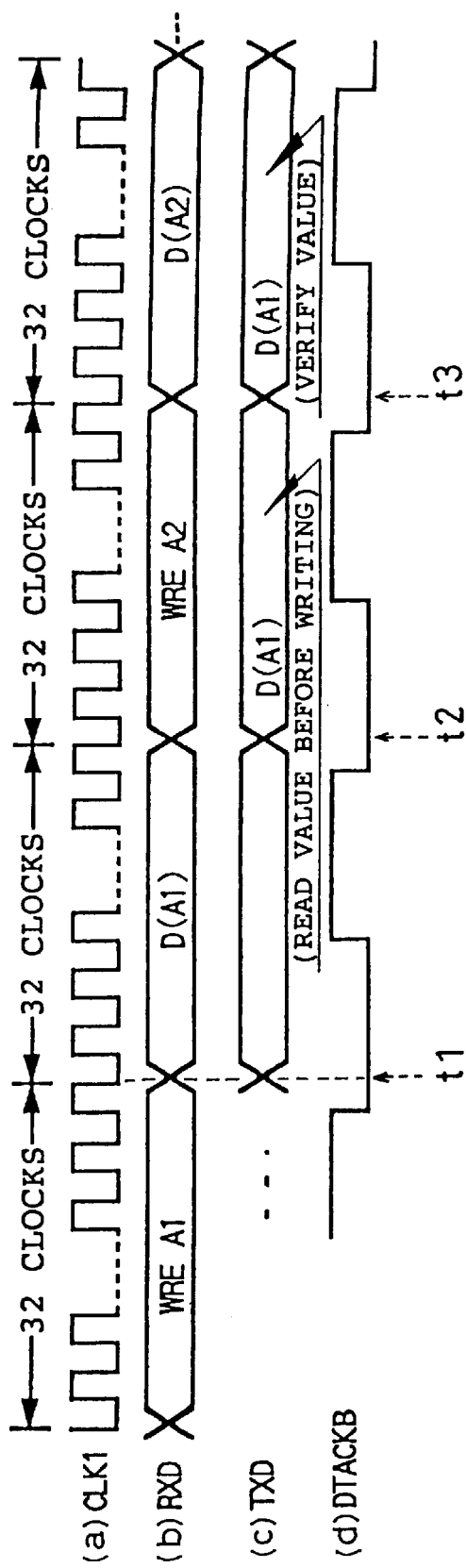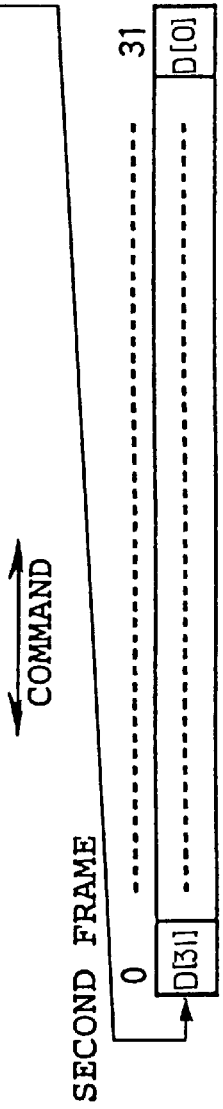

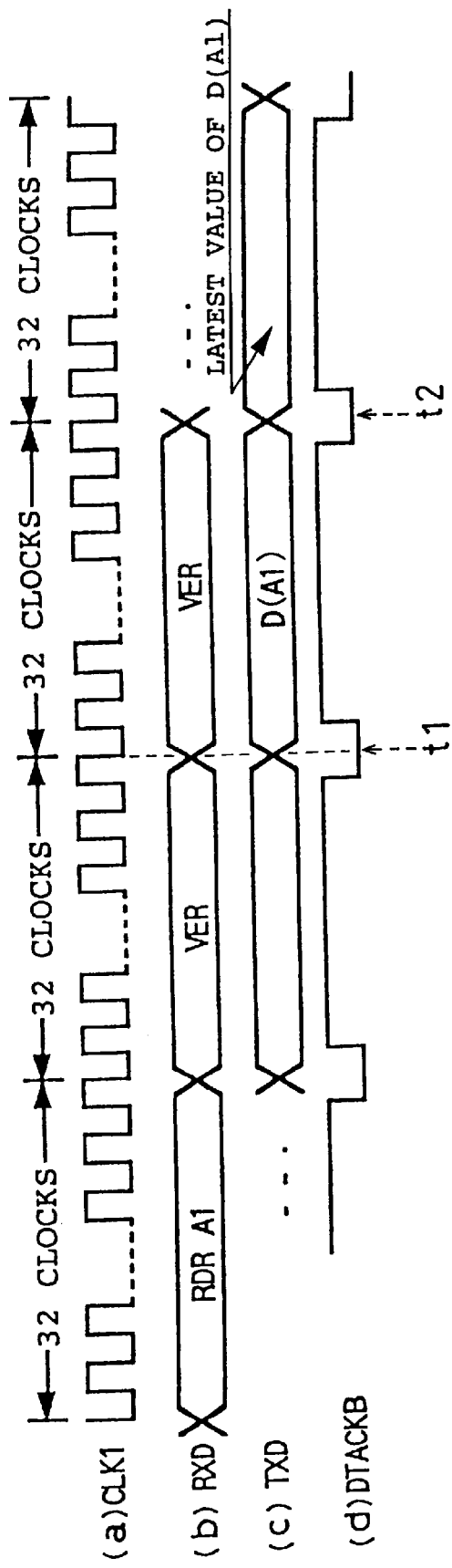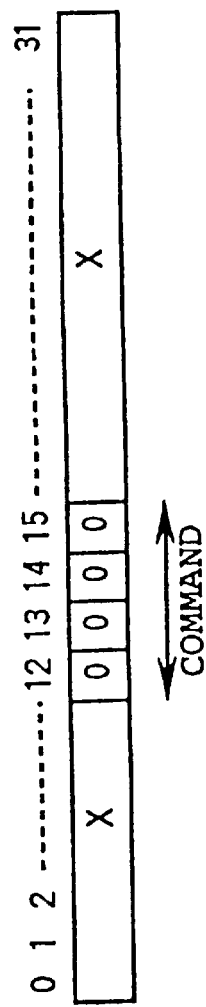

REAL TIME DEBUGGER FOR A MICROCOMPUTER

BACKGROUND OF THE INVENTION

1. Field of the Invention

This invention relates to a microcomputer which has a function of confirming operation of a program or verifying validity of a program.

2. Description of the Prior Art

FIG. 1 is a diagrammatic view showing a conventional system for confirming operation of a program or verifying validity of a program on a microcomputer. Referring to FIG. 1, reference numeral 101 denotes a system to be debugged including a microcomputer 102 having a CPU 103, and 104 a microcomputer provided for debugging a program of the microcomputer 102 and including a dual port RAM 105 and a serial input/output circuit 106 connected to the dual port RAM 105. Reference numeral 108 denotes an address bus of the microcomputer 102, 109 a data bus of the microcomputer, and 110 a system bus signal line of the microcomputer. The microcomputer 104 accommodates the address bus 108, the data bus 109 and the system bus signal line 110. Reference numeral 107 denotes a serial output data line from the serial input/output circuit 106. It is to be noted that the system bus signal line 110 transmits system bus signals such as a memory read signal or a memory write signal.

Operation will be described subsequently. It is convenient if the process during or a result of calculation by a program can be monitored in order to confirm operation of the program or verify validity of the program on the microcomputer 102. The system shown in FIG. 1 is constructed so as to satisfy such demand. It is to be noted that debugging herein signifies monitoring of data in the RAM during execution of a program. Where the microcomputer 102 of the debug object system 101 is a one-chip microcomputer which includes a ROM, a RAM and so forth built therein, the built-in RAM is used in actual application. However, upon debugging, the dual port RAM 105 on the microcomputer 104 is used as a RAM. In particular, upon debugging, data are written into the dual port RAM 105 and data are read out from the dual port RAM 105 while the microcomputer 102 is executing a program.

In the microcomputer 104, contents of the dual port RAM 105 are outputted suitably to the outside by way of the serial input/output circuit 106 and the serial output data line 107. A monitor system placed outside (not shown) having a display unit and an outputting apparatus receives the contents of the dual port RAM 105 from the microcomputer 104. Data of the RAM of the microcomputer 102 during execution of a program are provided to the monitor system in such a manner as described above. Then, a debugging person determines whether the data obtained at the monitor system are desired data or valid data. Then, based on the determination, the debugging person determines whether or not the program on the microcomputer 102 is valid.

Since the conventional microcomputer 102 is constructed in such a manner as described above, the microcomputer 102 accesses the inside RAM when it is actually working, but it accesses the dual port RAM 105 by way of the address bus 108, the data bus 109 and the system bus signal line 110, that is, the external buses when it is debugged. Since the accessing by way of the external bus requires a longer time than the accessing by way of the internal bus, as the bus cycle is raised to a high speed, access to the dual port RAM 105 becomes impossible. In other words, as the bus cycle is raised to a high speed, debugging becomes impossible, and consequently, there is a problem in that there is a limitation in increasing of the speed of the bus cycle. It is to be noted that a microcomputer which has an operation mode for analysis or debugging of software is disclosed in Japanese Patent Laid-Open No. Hei 5-334114.

SUMMARY OF THE INVENTION

The present invention has been made to eliminate such a program as described above, and it is an object of the present invention to provide a microcomputer which enables to monitor data in a RAM on the outside without using an external bus and besides without occupying an internal bus of a CPU.

According to the present invention, a microcomputer comprises a real time debugger which reads out data in the internal RAM when a CPU does not access the RAM and outputs the read out data to the outside if a read address of an internal RAM is received from the outside. The real time debugger confirms whether or not the CPU is accessing the RAM, and reads out data at an address designated from the outside from the RAM when the CPU is not accessing the RAM.

With the microcomputer, data in the RAM can be monitored on the outside without using an external bus, and even if the speed of the operation clocks of the CPU is raised, debugging is still possible.

According to an aspect of the real time debugger, it includes a plurality of address registers for storing address data designating addresses of the RAM supplied from the outside, and an address pointer for designating one of the address registers which corresponds to address data provided for the RAM. In the real time debugger of the construction just described, address data inputted from the outside are successively stored into the address registers, and the address data in the individual address registers are supplied to the RAM side successively in accordance with contents of the address pointer by which one of the address registers is designated.

With the microcomputer of the construction just described, data of a plurality of addresses can be used in a lump, and a monitor system on the outside can use read data efficiently.

The microcomputer may further comprise a local address bus provided between the real time debugger and the RAM, a local data bus provided between the RAM and the real time debugger, a switch for connecting the plurality of address registers of the real time debugger to the local address bus, and a switch for disconnecting an address bus of the CPU from the RAM. The real time debugger of the microcomputer of the construction just described, accesses the RAM by using the local address bus and the local data bus. When the real time debugger accesses the RAM, the switches disconnect the RAM and the CPU from each other.

The real time debugger can read out data of the RAM without occupying the buses of the CPU and does not obstruct operation of the CPU upon debugging.

According to another aspect of the real time debugger of the microcomputer, it further includes a control section for receiving a command including command data designating an operation condition of the real time debugger and address data designating a read address and performing an operation in accordance with the received command. The control section receives a command including command data and address data from the outside and performs such processing as reading out of data from the RAM in accordance with the command data in the received command.

With the microcomputer of the construction just described, a debugging system which can realize various debugging functions by developing an arbitrary command on the monitor system side provided on the outside can be constructed.

According to a further aspect of the real time debugger, it outputs a signal representing that data outputted to the outside is significant. The real time debugger of the construction just described outputs, when it reads out data of the RAM and outputs the data to the outside, to the outside also a signal representing that the data are significant.

With the microcomputer of the construction just described, a period of significant data can be detected readily on the monitor system side provided on the outside, and consequently, the construction of the monitor system can be simplified.

According to a still further aspect of the real time debugger of the microcomputer, it accommodates a reset signal line for transmitting a reset signal from the outside to the real time debugger, and another reset signal line for transmitting a reset signal from the CPU to the real time debugger. The real time debugger of the construction just described performs a resetting operation when a reset signal appears on the reset signal line from the outside or the reset signal line from the CPU.

With the microcomputer of the construction just described, the real time debugger can be reset simultaneously with resetting of the CPU, and it is also possible to reset the real time debugger independently.

According to a yet further aspect of the real time debugger of the microcomputer, it includes a status register for setting a status of an interruption request to the CPU and outputs contents of the status register to the outside. The real time debugger of the construction just described outputs data read out from the RAM as well as information indicating an interruption condition to the CPU to the outside.

With the microcomputer of the construction just described, also an interruption occurrence condition of the CPU can be recognized readily on the monitor system side provided on the outside.

According to a yet further aspect of the real time debugger of the microcomputer, it includes a counter for counting internal clocks of the CPU and outputs contents of the counter. The real time debugger of the construction just described outputs data read out from the RAM as well as a result of counting of the internal clocks of the CPU to the outside.

With the microcomputer of the construction just described, also time information of the real time debugger can be recognized readily on the monitor system side provided on the outside.

According to a yet further aspect of the real time debugger of the microcomputer, it accesses the RAM in response to a request from the outside when the CPU is not accessing the RAM. The real time debugger of the construction just described confirms whether or not the CPU is accessing the RAM, and reads out data at an address designated from the outside from the ROM when the CPU is not accessing the RAM. Or, when the CPU is not accessing the RAM, the real time debugger writes data supplied thereto from the outside to a designated address.

With the microcomputer of the construction just described, data in the RAM can be monitored without using an external bus, and data supplied from the outside can be written into the RAM. Consequently, debugging can be performed even if the speed of the operation clocks of the CPU is raised.

According to another aspect of the microcomputer, it further comprises a pair of emulation ROMs having a same address space and accessible from the CPU only to read out data but accessible from the real time debugger to read out and write data, and the real time debugger accesses, in response to a request from the outside, that one of the emulation ROMs which is not being used by the CPU.

In the microcomputer of the construction just described, when the CPU is using one of the emulation ROMs, the real time debugger changes contents of the other emulation ROM, and the emulation ROM to be used by the CPU after the change of the contents can be changed over. In other words, the program can be changed during operation of the CPU.

According to a further aspect of the microcomputer, it further comprises a local address bus provided between the real time debugger and the RAM, a local data bus provided between the RAM and the real time debugger, a pair of switches provided between the RAM and the local buses, another pair of switches provided between the RAM and the buses of the CPU, a buffer for outputting data in the RAM to the local data bus, and another buffer for outputting data in the RAM to the data bus of the CPU. The real time debugger accesses the RAM by using the local address bus and the local data bus. When the real time debugger accesses the RAM, the switches and the buffers disconnect the RAM and the CPU from each other.

In the microcomputer of the construction just described, the real time debugger can read out data of the RAM without occupying the buses of the CPU. Consequently, the real time debugger does not obstruct the operation of the CPU upon debugging.

According to a still further aspect of the microcomputer, the real time debugger includes a control section for receiving a command including command data designating an operation condition of the real time debugger and address data designating a read address and performing an operation in accordance with the received command. The control section receives a command including command data and address data from the outside and performs such processing as reading out of data from the RAM in accordance with the command data in the received command or writing of data into the RAM.

With the microcomputer of the construction just described, a flexible debugging system which can realize various debugging functions by developing an arbitrary command on the monitor system side provided on the outside can be constructed.

According to a yet further aspect of the microcomputer, the control section detects, when a recovery command constituted from bits all having an equal value is received, a bit in a command received subsequently to the return command which has a value different from the value of the bits constituting the recovery command, and re-establishes synchronism of a command to be received. The real time debugger of the construction just described detects, when it receives a recovery command developed in response to detection of a run-away condition of the real time debugger, a different polarity bit portion of a command received next to the recovery command and re-establishes bit-synchronism of succeeding reception of a command.

With the microcomputer of the construction just described, when the operation of the real time debugger goes wrong because of a bit shift of a received command or from some other cause, the real time debugger can be initialized without supplying a reset signal to it.

According to a yet further aspect of the microcomputer, the real time debugger outputs, upon starting of sending out of data to be outputted to the outside, a signal having a pulse width corresponding to a command by which the data are requested. The real time debugger of the construction just described outputs, when it sends out data therefrom, a signal having a pulse width corresponding to a received command so that a monitor system provided on the outside may discriminate a delimitation of the data readily and besides it can be recognized readily in response to which command the data are outputted.

With the microcomputer of the construction just described, the head of data can be detected readily on the monitor system side provided on the outside, and besides, it can be detected readily in response to which one of sent out commands data are outputted. Consequently, the construction of the monitor system can be simplified.

According to a yet further aspect of the microcomputer, the real time debugger accommodates a reset signal line for transmitting a reset signal from the CPU to the real time debugger. The real time debugger of the construction just described performs a resetting operation when a reset signal appears on the reset signal line from the CPU.

With the microcomputer of the construction just described, also the real time debugger is reset simultaneously with resetting of the CPU.

BRIEF DESCRIPTION OF THE DRAWINGS

FIG. 3 is a block diagram showing a construction of a microcomputer according to a second embodiment of the present invention together with an external monitor system;

FIG. 4 is a block diagram showing an internal construction of an RTD;

FIG. 6(A) is a time chart illustrating a signal outputting timing when contents of the RAM are outputted on the real time basis;

FIG. 6(B) is a format diagram illustrating an RDR command;

FIG. 7(A) is a time chart illustrating a signal outputting timing when contents of the RAM are re-written on the real time basis;

FIG. 7(B) is a format diagram illustrating a WRR command;

FIG. 8(A) is a time chart illustrating a signal outputting timing when contents of an emROM are outputted;

FIG. 8(B) is a format diagram illustrating an RDE command;

FIG. 9(A) is a time chart illustrating a signal outputting timing when contents of the emROM are re-written;

FIG. 9(B) is a format diagram illustrating a WRE command;

FIG. 10(A) is a time chart illustrating a signal outputting timing upon continued monitoring;

FIG. 10(B) is a format diagram illustrating a VER command;

DETAILED DESCRIPTION OF THE PREFERRED EMBODIMENTS

Embodiment 1

Figure 1:
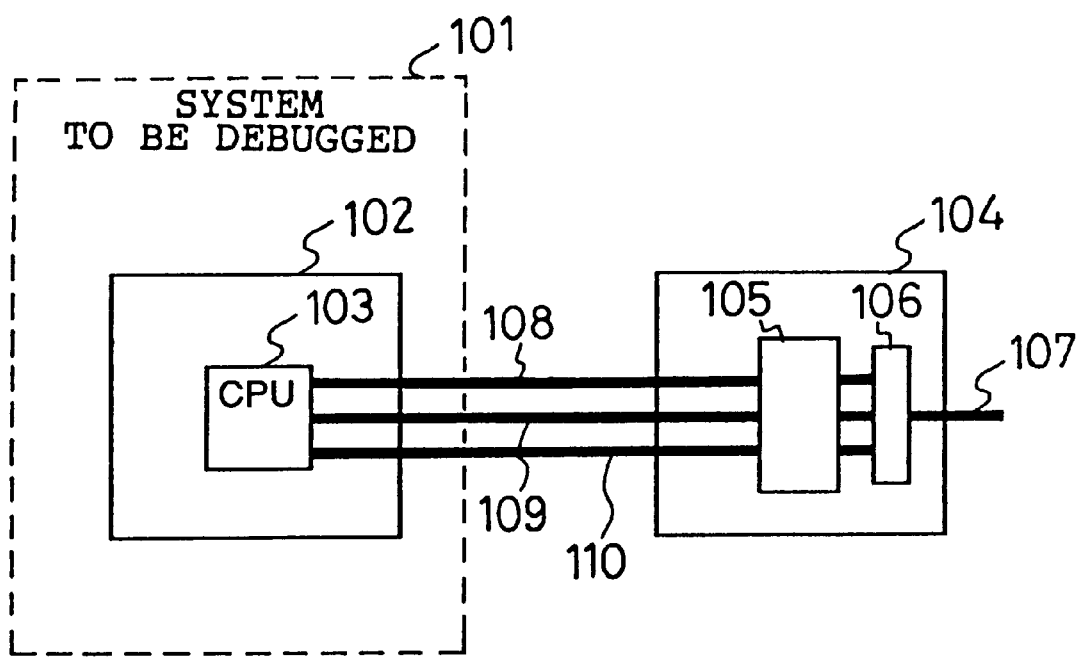
FIG. 1 is a diagrammatic view showing a conventional system for confirming operation of a program or verifying validity of a program on a microcomputer.
Figure 2:
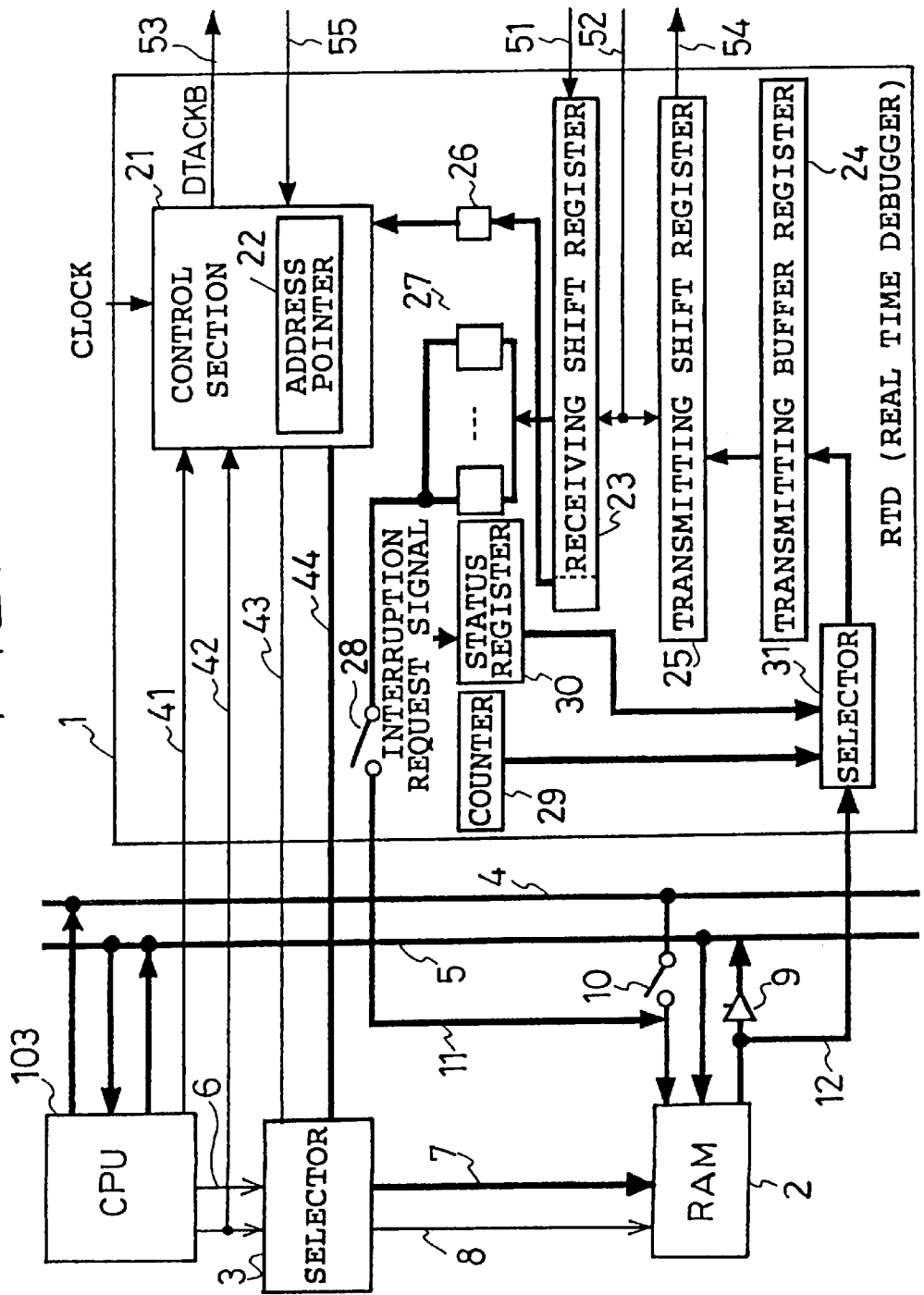
FIG. 2 is a block diagram showing a construction of a microcomputer according to a first embodiment of the present invention.

FIG. 2 is a block diagram showing a construction of a microcomputer according to a first embodiment of the present invention. Referring to FIG. 2, reference numeral 1 denotes a real time debugger (hereinafter referred to as RTD) built in a microcomputer for supporting debugging, 2 a RAM built in the microcomputer, 3 a selector for supplying one of a control signal from a CPU 103 side and another control signal from the RTD 1 side to the RAM 2, 4 an address bus of the CPU 103, 5 a data bus of the CPU 103, 6 a system bus signal line from the CPU 103, 7 a system bus signal line from the selector 3 to the RAM 2, 8 a RAM select signal line for transmitting a RAM select signal from the selector 3 to the RAM 2, 9 a buffer provided between the RAM 2 and the data bus 5, 10 a switch for deciding whether an address signal to be supplied to the RAM 2 should be inputted from the address bus 4 or a local address bus 11 of the RTD 1, and 12 a local data bus from the RAM 2 to the RTD 1.

In the RTD 1, reference numeral 21 denotes a control section including an address pointer 22 for controlling fetching of data in the RAM 2 into the RTD 1 side; 23, a receiving shift register for receiving a command from a monitor system provided on the outside; 24, a transmitting buffer resistor to which data to be outputted to the monitor system are set; 25, a transmitting shift register for outputting data to the monitor system; 26, a command register for storing command data from the receiving shift register 23; 27, an address register for storing address data from the receiving shift register 23; 28, a switch for connecting the address register 27 to the local address bus 11; 29, a counter for counting a clock signal used in the inside of the microcomputer; 30, a status register having a bit whose polarity is reversed in response to generation of an interruption request in the microcomputer; and 31, a selector for supplying an output of the local data bus 12, a count value of the counter 29 or a set value of the status register 30 to the transmitting buffer register 24. It is to be noted that, in the present embodiment, sixteen address registers 27 are provided.

Reference numeral 41 denotes a reset signal line for transmitting a reset signal to be provided from the CPU 103 to the RTD 1; 42, a RAM select signal line for transmitting a RAM select signal from the CPU 103; 43, a RAM select signal line for transmitting a RAM select signal outputted from the RTD 1; 44, a system bus signal line for transmitting a system bus signal outputted from the RTD 1; 51, a serial input data line for transmitting a command from the monitor system; 52, a clock line for transmitting a shift clock signal; 53, a signal line for transmitting an acknowledge signal (DTACKB signal) outputted from the control section 21; 54, a serial output data line for transmitting serial data from the transmitting shift register 25; and 55, a reset signal line for transmitting a reset signal provided from the outside to the RTD 1.

Subsequently, operation will be described. The CPU 103 performs predetermined controlling operation in accordance with a program. Then, in order to access the RAM 2, the CPU 103 outputs address data to the address bus 4 and supplies a necessary system bus signal to the RAM 2. In order to write data, the CPU 103 outputs write data to the data bus 5. In order to read data, data are outputted from the RAM 2 to the data bus 5. In this instance, the selector 3 is set such that it outputs a RAM select signal from the CPU 103 side to the RAM select signal line 8 and outputs a system bus signal from the CPU 103 side to the system bus signal line 7. Meanwhile, the switch 10 is set in a closed condition, and the switch 28 is set in an open condition. The buffer 9 is in an conducting condition.

In order to read out data in the RAM 2 and output the data to the outside, the RTD 1 can use, for example, such commands as given below.

| mnemonic | command | operand |
|----------|---------|---------|
| INI | 00 | none |
| SET | 01 | A0 to A14 |
| SAR | 10 | A15 |
| TRN | 11 | none |

"INI" is a command to return the internal condition of the RTD 1 into an initial condition. In order to change the setting of an address, this command is transmitted to the RTD 1 prior to transmission of new address data. "SET" is a command to perform setting of a read address. "SAR" is a command for instruction to complete setting of a read address and start access to the RAM. "TRN" is a command for instruction to assert a DTACKB signal and start transmission of data by the RTD 1. It is to be noted that, in the present embodiment, each of A0 to A15 represents an address.

When the external monitor system tries to read out data of the RAM 2, it transmits, for example, such command sequence as given below to the RTD 1.

```
SET A0
SET A1
    .
    .
    .
SET A14
SAR A15
TRN
    .
    .
    .
INI
SET A0
SET A1
    .
    .
    .
SET A14
SAR A15
TRN
    .
```

The RTD 1 has been reset by a reset signal inputted thereto by way of the reset signal line 55 or by a reset signal to the CPU 103 inputted by way of the reset signal line 41. The set value of the address pointer 22 after such resetting is 0, and also the value of the command register 26 is 0. After resetting, the control section 21 is in a condition in which it waits reception of address data. Further, the control section 21 sets the DTACKB signal to "1(high level)." Furthermore, the connection condition between the receiving shift register 23 and the address registers 27 are set so that the output of the receiving shift register 23 is inputted to the address register 27 for the first address data (A0). It is to be noted that the DTACKB signal is low active.

The commands are successively inputted to the receiving shift register 23 in synchronism with rising edges of a clock signal on the clock line 52 by way of the serial input data line 51. The upper 2 bits of the receiving shift register 23 are set to the command register 26. The command received first, that is, "SET A0," includes first address data, and after reception of the command is completed, the upper 2 bits of the command are transferred to the command register 26 whereas the other address data are transferred to the address register 27 for A0. When the reception of the command is completed, the value of the address pointer 22 is incremented by +1. Further, the connection condition between the receiving shift register 23 and the address registers 27 is set so that the output of the receiving shift register 23 is inputted to the address register 27 for the second address data (A1).

Thereafter, the commands "SET A1" to "SAR A15" are successively received, and the address data in the individual commands are set to the corresponding address registers 27. After reception of "SAR A15" is completed, "01" is set to the command register 26. The control section 21 detects that "01" has been set to the command register 26 and thus determines that reception of a series of data including address data has been completed. Then, the control section 21 returns the value of the address pointer 22 to 0. Further, the control section 21 starts reading out of data in the RAM 2. It is to be noted that, while the RTD 1 operates in such a manner as described above, the CPU 103 executes a program irrespective of the operation of the RTD 1.

A RAM select signal indicating that the CPU 103 is accessing the RAM 2 is inputted to the control section 21. The control section 21 starts accessing to the RAM 2 when the RAM select signal becomes insignificant. In particular, the control section 21 first controls the switch 10 to an open condition and controls the buffer 9 to put the outputting condition thereof into a high impedance condition. Further, the control section 21 sets the connection condition of the selector 3 so that the RAM select signal from the RTD 1 may be outputted to the RAM select signal line 8 and a system bus signal outputted from the RTD 1 may be outputted to the system bus signal line 7. Furthermore, the control section 21 controls the switch 28 to a closed condition. Consequently, the RAM 2 and the data bus 5 are disconnected from each other, and the RAM 2 and the address bus 4 are disconnected from each other. Then, the local address bus 11 from the RTD 1 is connected to the address input of the RAM 2. Here, the connection condition of the address registers 27 and the local address bus 11 is set so that contents of that one of the sixteen address registers 27 which corresponds to the value of the address pointer 22 may be outputted to the local address bus 11.

The control section 21 renders the RAM select signal significant and outputs a signal for instruction to read out to the system bus signal line 44. The RAM 2 receives the RAM select signal and the system bus signal from the control section 21 by way of the selector 3. Consequently, the RAM 2 outputs address data (A0) corresponding to the contents of the first address register 27 inputted by way of the local address bus 11 to the local data bus 12. The selector 31 is set so that the local data bus 12 is connected to the transmitting buffer register 24 while the value of the address pointer 22 remains from 0 to 15. Accordingly, the contents of an address designated by the address data (A0) are transferred to the transmitting buffer register 24 by way of the local data bus 12.

Contents of the transmitting shift register 25 are outputted to the serial output data line 54 in synchronism with falling edges of the clock signal on the clock line 52. After all of the contents of the transmitting shift register 25 are outputted, the contents of the transmitting buffer register 24 are transferred to the transmitting shift register 25, and the contents are outputted from the transmitting shift register 25 to the serial output data line 54. In other words, the contents of the address designated by the address data (A0) are outputted to the serial output data line 54. The control section 21 asserts a DTACKB signal simultaneously when significant data begin to be outputted to the serial output data line 54. In particular, the control section 21 changes the DTACKB signal to the low level. In this instance, when the contents of the address designated by the address data (A0) begin to be outputted to the serial output data line 54, the DTACKB signal changes to the low level. The monitor system installed outside recognizes that significant data are being outputted to the serial output data line 54 while the DTACKB signal remains at the low level.

Thereafter, the control section 21 increments the value of the address pointer 22 by +1. Consequently, the connection between the local address bus 11 and the address registers 27 is set so that contents of the second address register 27 may be outputted to the local address bus 11. Then, the control section 21 renders the RAM select signal significant and outputs a signal for instruction to read out to the system bus signal line 44. Consequently, the RAM 2 outputs data in the address designated by the address data (A1) to the local data bus 12. The data of the local data bus 12 are set to the transmitting buffer register 24 by way of the selector 31. The control section 21 increments the value of the address pointer 22 by +1. The data in the transmitting buffer register 24 are transferred to the transmitting shift register 25 after all of the contents of the transmitting shift register 25 at present are outputted. Then, the contents are outputted from the transmitting shift register 25 to the serial output data line 54.

After the data in the transmitting buffer register 24 are transferred to the transmitting shift register 25, the control section 21 renders the RAM select signal significant and outputs a signal for instruction to read out to the system bus signal line 44 in order to read out data at an address designated by the next address data (A2) from the RAM 2.

The steps of operation described above are successively executed, and finally, data in an address designated by the last address data (A15) are read out from the RAM 2. The data thus read out are outputted to the serial output data line 54 by way of the transmitting buffer register 24 and the transmitting shift register 25. After the data at the address designated by the last address data (A15) are transferred to the transmitting buffer register 24, the value of the address pointer 22 changes to "16."

When the value of the address pointer 22 is "16" and the transmitting buffer register 24 becomes empty, the control section 21 changes over the selector 31 so that the output of the counter 29 may be transferred to the transmitting buffer register 24. The counter 29 counts internal clocks of the microcomputer. Accordingly, the count value then is transferred to the transmitting buffer register 24. After contents of the transmitting shift register 25 at present are all outputted, they are transferred to the transmitting shift register 25. Then, the contents in the transmitting shift register 25 are outputted to the serial output data line 54. The monitor system installed outside receives the count value and can obtain time information during use of the RTD from the received value.

After the count value is transferred to the transmitting buffer register 24, the control section 21 increments the value of the address pointer 22 by +1. In particular, the value of the address pointer 22 changes to "17." When the value of the address pointer 22 is "17" and the transmitting buffer register 24 becomes empty, the control section 21 changes over the selector 31 so that the output of the status register 30 may be transferred to the transmitting buffer register 24. Accordingly, the value of the status register 30then is transferred to the transmitting buffer register 24. After contents of the transmitting shift register 25 at present are all outputted, they are transferred to the transmitting shift register 25. Then, the contents in the transmitting shift register 25 are outputted to the serial output data line 54. The status register 30 reverses its bit if an interruption request is produced in the microcomputer. Accordingly, the monitor system can recognize, by discriminating the value of the status register 30, whether or not an interruption request has been produced in the microcomputer. In particular, if the value of the status register 30 received at present does not coincide with the value of the status register 30 received previously, then the monitor system can recognize that an interruption request has occurred between the time at which the value of the status register 30 was received previously and the present time.

After the output of the status register 30 is transferred to the transmitting buffer register 24, the control section 21 changes the value of the address pointer 22 to "0." Then, the processing of one cycle from the step at which contents of an address designated by the address data (A0) are read out from the RAM 2 and outputted to the serial output data line 54 to the step at which the value of the status register 30 is outputted to the serial output data line 54 is executed again. It is to be noted that, when the control section 21returns the value of the address pointer 22 to "0," it changes the DTACKB signal to "1" for a period of one clock of the clock signal on the clock signal line. The monitor system installed outside can recognize, by detecting that the DTACKB signal has momentarily become insignificant, that data transferring processing for one cycle has been completed. Further, the control section 21 confirms, before it renders the RAM select signal on the RAM select signal line 43 significant, without fail whether or not the RAM select signal from the CPU 103 is significant. When the RAM select signal from the CPU 103 is significant, the control section 21 does not render the RAM select signal on the RAM select signal line 43 significant until after the signal becomes insignificant.

The monitory system successively outputs the TRN command while the data transferring processing is continuing. Since the upper 2 bits of the TRN command are "11," "11" are successively set to the command register 26. The control section 21 successively performs the data transferring processing described above as far as the contents of the command register 26 are "11."

The monitor system outputs an INI command when it attempts to change the data read address for the RAM 2. Consequently, the upper 2 bits "00" of the INI command are set to the command register 26. The control section 21 performs initialization processing if it detects that the contents of the command register 26 are "00." In particular, the control section 21 returns the value of the address pointer 22 to "0" and enters into a condition wherein it waits reception of the command "SET A0."

Data for arbitrary 16 addresses of the RAM 2 are outputted to the outside in a condition wherein the CPU 103 is executing a program while accessing the RAM 2 built in the microcomputer in such a manner as described above. Besides, data transferring processing to the outside is executed when the CPU 103 does not access the RAM 2.

Embodiment 2

FIG. 3 is a block diagram showing a construction of a microcomputer according to a second embodiment of the present invention together with an external monitor system.

In the microcomputer, reference numeral 1A denotes an RTD built in the microcomputer for supporting debugging, 2 a RAM built in the microcomputer, 4 an address bus of a CPU 103, 5 a data bus of the CPU 103, 6 a system bus signal line from the CPU 103, 41 a reset signal line for transmitting a reset signal to be provided from the CPU 103 to the RTD 1A, 42 a RAM select signal line for transmitting a RAM select signal from the CPU 103, and 45 an emROM select signal line for transmitting an emROM select signal from the CPU 103.

Reference numeral 61 denotes a first emROM (emulation ROM) for emulating the ROM used in actual working of microcomputer, 62 a second emROM (emulation ROM) having addresses allocated in a same address space as that of the first emROM 61, 11 a local address bus provided between the first emROM 61 and the second emROM 62, 12 a local data bus provided among the RTD 1A, the RAM 2, the first emROM 61 and the second emROM 62, 43 a RAM select signal line for transmitting a RAM select signal from the RTD 1A, 44 a system bus signal line for transmitting a system bus signal from the RTD 1A, 71 a first emROM select signal line for transmitting the first emROM select signal from the CPU 103, 72 a first emROM select signal line for transmitting a first emROM select signal from the CPU 103, 73 a second emROM select signal line for transmitting a second emROM select signal from the RTD 1A, and 74 a second emROM select signal line for transmitting a second emROM select signal from the CPU 103. It is to be noted that the RAM select signal outputted from the CPU 103 passes the RTD 1A and is transmitted by way of the RAM select signal line 42 extending from the RTD 1A to the RAM 2.

In the monitor system, reference numeral 81 denotes a monitor for providing a predetermined command to the RTD 1A in the microcomputer and receiving data from the RTD 1A, and 82 an emROM status register connected to the address bus 4 and the data bus 5 of the CPU 103 and including an emROM changing over requesting bit and an emROM selection condition bit. The emROM selection condition bit is, for example, "1" when the CPU 103 selects the first emROM 61 but "0" when the CPU 103 selects the second emROM 62. Reference numeral 83 denotes a signal line for transmitting an emROM changing over requesting signal from the monitor 81 to the emROM status register 82, and 84 a signal line for transmitting contents of the emROM selection condition bit from the emROM status register 82 to the RTD 1A.

Reference numeral 51 denotes a serial input data line for transmitting a command from the monitor 81, 52 a clock line for transmitting a clock signal (shift clocks), 53 a signal line for transmitting a DTACKB signal outputted from the control section 21, and 54 a serial output data line for transmitting serial data from the RTD 1A.

FIG. 4 is a block diagram showing an internal construction of the RTD 1A. In the RTD 1A, reference numeral 21A denotes a control section for controlling accessing to the RAM 2 and the emROMs, 23 a receiving shift register for receiving a command from the monitor system provided on the outside, 24 a transmitting buffer to which data to be outputted to the monitor system are set, 25 a transmitting shift register for outputting data to the monitor system, and 26 a command register for storing command data in a received command. Reference numeral 32 denotes an address register for storing address data in a received command, 33 an address bus driver provided between the address register 32 and the local address bus 11, 34 a data register for storing data of the second frame of a received command, and 35 a data output buffer provided between the data register 34 and the local data bus 12.

Subsequently, operation will be described. The microcomputer shown in FIG. 3 is used upon debugging, and a program to be used in actual working is set to the first emROM 61 or the second emROM 62. In actual working, a microcomputer which has a same architecture as that of the present microcomputer and includes a built-in ROM in place of the first emROM 61 and the second emROM 62 is used. The terminology "in actual working" signifies "when a system including a microcomputer having a program for which debugging has been completed is installed and run in an apparatus used by a user." The first emROM 61 and the second emROM 62 have same addresses and an equal capacity, and only one of them is accessed from the CPU 103. Further, while the CPU 103 can perform only reading out of data from the first emROM 61 and second emROM 62, the RTD 1A can perform both of reading out and writing of data from and into the first emROM 61 and the second emROM 62.

Further, the microcomputer used here is presumed to be a 32-bit microcomputer. The RAM 2 is presumed to be a RAM having a capacity of 8 Kbytes of the addresses of 00001000"H" to 00002FFF"H," and the first emROM 61 and the second emROM 62 are each presumed to be an emROM having a capacity of 4 Kbytes of the addresses of FF000000"H" to FF000FFF"H." Then, it is presumed that, if, for example, the address of "0001 0000 0000 00XX (binary)" (X: indefinite) is provided to the RAM 2, data of 4 bytes at 00001000"H" to 00001003"H" are accessed.

Changing over between the first emROM 61 and the second emROM 62 will be described. It is assumed that the CPU 103 is using the first emROM 61. In this instance, the emROM selection condition bit of the emROM status register 82 is "1." When the emROM selection condition bit is "1," if an emROM select signal is outputted from the CPU 103 to the emROM select signal line 45, then the RTD 1A outputs an emROM selection signal to the first emROM select signal line 72. In order to change over the emROM to be used by the CPU 103, the monitor 81 sets the emROM changing over requesting bit of the emROM status register 82. The CPU 103 can access the emROM changing over requesting bit by way of the data bus 5. It is to be noted that the program of the CPU 103 is programmed so as to periodically check the emROM changing over requesting bit.

If the CPU 103 recognizes that the emROM changing over requesting bit has been set, it changes the emROM selection condition bit to "0." Further, the CPU 103 resets the emROM changing over requesting bit. The condition of the emROM selection condition bit is inputted to the RTD 1A. Thereafter, the RTD 1A outputs an emROM select signal to the second emROM select signal line 74 when an emROM select signal is outputted from the CPU 103 to the emROM select signal line 45. In other words, the CPU 103 uses the second emROM 62. In order to change over the emROM to be used by the CPU 103 again, the monitor 81 sets the emROM changing over requesting bit again. Consequently, the CPU 103 changes the emROM selection condition bit to "1" and resets the emROM changing over requesting bit. Thereafter, when an emROM select signal is outputted from the CPU 103 to the emROM select signal line 45, the RTD 1A outputs an emROM select signal to the first emROM select signal line 72. In other words, the CPU 103 uses the first emROM 61.

Where the emROM to be used by the CPU 103 can be changed over in this manner, the RTD 1A can access the other emROM without having an influence upon an accessing operation of the emROM by the CPU 103. Accordingly, while the CPU 103 is using one of the emROMs, the RTD 1A can vary the contents of the other emROM and, after such variation of the contents, can change over the emROM to be used by the CPU 103. In other words, during operation of the CPU 103, the program can be changed.

Embodiment 3

The RTD 1A built in the microcomputer realizes the following functions in response to an instruction of the monitor.

1. Real time RAM contents outputting
2. Real time RAM contents re-writing
3. EmROM contents outputting
4. EmROM contents re-writing
5. Continued monitoring
6. Recovery from a run-away condition In order to realize the functions described above, the RTD 1A can use the following commands from the monitor 81.

|  | command | | | |
| --- | --- | --- | --- | --- |
| mnemonic | 12 | 13 | 14 | 15 |
| VER (VERify) | 0 | 0 | 0 | 0 |
| RDR (ReaD Ram) | 0 | 0 | 1 | 0 |
| WRR (WRite Ram) | 0 | 0 | 1 | 1 |
| RDE (Read Emrom) | 0 | 1 | 0 | 0 |
| WRE (WRite Emrom) | 0 | 1 | 0 | 1 |
| RCV (ReCoVer) | 1 | 1 | 1 | 1 |

It is assumed that the commands here are constituted from 32 bits. "VER" is a command for instruction of continued monitoring; "RDR" is a command for instruction of real time RAM contents outputting; "WRR" is a command for instruction of RAM contents re-writing (with verification); "RDE" is a command for instruction of emROM contents outputting; "WRE" is a command for instruction of emROM contents re-writing (with verification); and "RCV" is a command for instruction of recovery from a run-away condition.

The RTD 1A renders the DTACKB signal significant when it sends out data in response to a command from the monitor system. In other words, the RTD 1A changes the DTACKB signal to the low level. The duration of the low level depends upon the command received. When data is to be sent out in response to an RDR command, an RDE command or a VER command, the RTD 1A changes the DTACKB signal to the low level only for a period of one clock of the clock signal on the clock line 52. When data is to be sent out in response to a WRR command, the RTD 1A changes the DTACKB signal to the low level only for a period of two clocks of the clock signal on the clock line 52. When data is to be outputted in response to a WRE command, the RTD 1A changes the DTACKB signal to the low level only for a period of three clocks of the clock signal on the clock line 52. When data is to be sent out in response to an RCV command, the RTD 1A changes the DTACKB signal for a period of four or more clocks of the clock signal on the clock line 52. It is to be noted that the construction of the microcomputer according to the present invention is such as, for example, shown in FIG. 3.

Figure 5A:
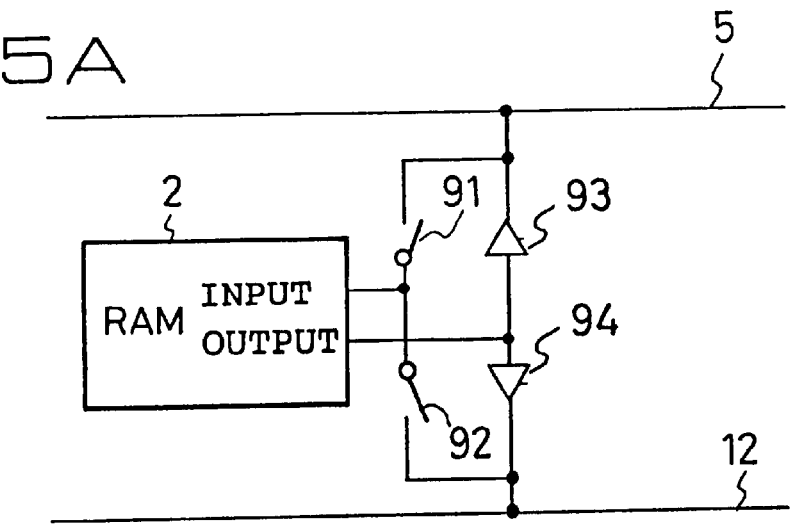
FIGS. 5(A) and 5(B) are circuit diagrams showing a RAM and associated elements in detail.
Figure 5B:
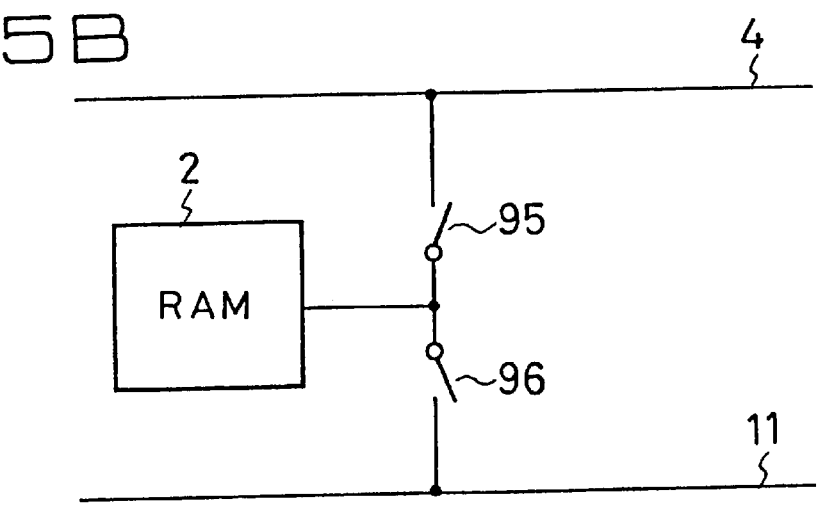

Subsequently, operation will be described. FIGS. 5(A) and 5(B) are circuit diagrams showing elements associated with the RAM 2 in detail. As shown in FIG. 5(A), a switch 91 is interposed between the data bus 5 of the CPU 103 and the input side of the RAM 2 while another switch 92 is interposed between the local data bus 12 and the input side of the RAM 2. Further, a buffer 93 is interposed between the output side of the RAM 2 and the data bus 5 of the CPU 103 while another buffer 94 is interposed between the output side of the RAM 2 and the local data bus 12. As shown in FIG. 5(B), a switch 95 is interposed between the address bus 4 of the CPU 103 and the address input of the RAM 2 while another switch 96 is interposed between the local address bus 11 and the address input of the RAM 2.

When the RTD 1A tries to read out data from the RAM 2, the RTD 1A produces a reading out control signal and outputs it to the system bus signal line 44. Further, the RTD 1A outputs a RAM select signal to the RAM select signal line 43. The RAM 2 puts the buffer 94 into a conducting condition in response to the control signal and the RAM select signal. The switches 91 and 92 are in an open condition, and the buffer 93 is in a high impedance condition. Further, the RAM 2 closes the switch 96 and puts the switch 95 into an open condition. Consequently, the RAM 2 outputs data at an address designated by address data on the local address bus 11 to the local data bus 12. When the RTD 1A tries to write data into the RAM 2, it produces a writing control signal and outputs it to the system bus signal line 44. Further, the RTD 1A outputs a RAM select signal to the RAM select signal line 43. The RAM 2 closes the switch 92 in response to the control signal and the RAM select signal. The buffers 93 and 94 are in a high impedance condition and the switch 91 is in an open condition. Further, the RAM 2 closes the switch 96 and puts the switch 95 into an open condition. Consequently, the RAM 2 writes data outputted to the local data bus 12 to an address designated by address data on the local address bus 11.

When the CPU 103 tries to read out data from the RAM 2, it produces a reading out control signal and outputs it to the system bus signal line 6. The control signal on the system bus signal line 6 is outputted to the system bus signal line 44 by way of the RTD 1A. Further, the CPU 103 outputs a RAM select signal to the RAM select signal line 42. The RAM select signal is outputted to the RAM select signal line 42 on the RAM 2 side by way of the RTD 1A. The RAM 2 puts the buffer 93 into a conducting condition in response to the control signal and the RAM select signal. The switches 91 and 92 are in an open condition, and the buffer 94 is in a high impedance condition. Further, the RAM 2 closes the switch 95 and puts the switch 96 into an open condition. Consequently, the RAM 2 outputs data at an address designated by address data on the address bus 4 to the data bus 5.

When the CPU 103 tries to write data into the RAM 2, it produces a writing control signal and outputs it to the system bus signal line 6. The control signal on the system bus signal line 6 is outputted to the system bus signal line 44 by way of the RTD 1A. Further, the CPU 103 outputs a RAM select signal to the RAM select signal line 42. The RAM select signal is outputted to the RAM select signal line 42 on the RAM 2 side by way of the RTD 1A. The RAM 2 closes the switch 91 in response to the control signal and the RAM select signal. The buffers 93 and 94 are in a high impedance condition, and the switch 92 is in an open condition. Further, the RAM 2 closes the switch 95 and puts the switch 96 into an open condition. Consequently, the RAM 2 writes data outputted to the data bus 5 from the CPU 103 to an address designated by address data on the address bus 4 of the CPU 103 side.

Subsequently, real time RAM contents outputting will be described with reference to timings and a command format illustrated in FIGS. 6(A) and 6(B). Referring to FIG. 6(A), reference character (a) denotes a clock signal on the clock line 52; (b) a signal on the serial input data line 51; (c) a signal on the serial output data line 54; and (d) a DTACKB signal appearing on the signal line 53. The RDR command has, for example, as seen from FIG. 6(B), command data of the twelfth to fifteenth bits and address data of the eighteenth to twenty-ninth bits. The address data include bits for designating the addresses A(2) to A(13). It is to be noted that, similarly as in the first embodiment, reference characters A1, A2, A3 and so forth individually represent address data. Further, A(i) (i=0 to 31) signifies a bit of one address.

When it is tried to read out data at a particular address of the RAM 2 to the external monitor system side, the monitor 81 sends out a RDR command to the serial input data line 51. The RDR command is successively inputted to the receiving shift register 23 in synchronism with rising edges of the clock signal on the clock line 52. It is assumed that the RDR command inputted then includes address data which designate the address A1 as seen in FIG. 6(A). After the command constituted from 32 bits from the monitor 81 is completely inputted to the receiving shift register 23 (at the timing t1 in FIG. 6(A)), the command data in the command are transferred to the command register 26. The control section 21A analyzes the data stored in the command register 26 and determines that the received command is an RDR command. Consequently, the control section 21A controls so that the address data in the command may be transferred to the address register 32.

A RAM select signal from the CPU 103 is introduced into the control section 21A. If the RAM select signal from the CPU 103 is not significant, then the control section 21A sets the address bus driver 33 to a passing condition. Consequently, contents of the address register 32 are outputted to the local address bus 11. Further, the control section 21A renders the RAM select signal line 43 significant and supplies a RAM select signal to the RAM 2, and outputs a control signal for instruction to read out data to the system bus signal line 44. The RAM 2 outputs data at an address designated by the address data on the local address bus 11 to the local data bus 12 in response to the RAM select signal and the control signal on the system bus signal line 44. More particularly, data for four address beginning with the address designated by the address data are outputted. In other words, data of four bytes are outputted. The detailed data reading out control of the RAM 2 is such as described hereinabove.

The data on the local data bus 12 is inputted to the transmitting buffer register 24. The input timing is a point of time between the timing t1 and the timing t2 illustrated in FIG. 6(A). It is to be noted that, in FIG. 6(A), it can be seen that, subsequently to the RDR command including the address data designating the address A1, another RDR command including address data designating the address A2 is sent out from the monitor 81.

The data in the transmitting buffer register 24 is transferred to the transmitting shift register 25 in synchronism with completion of reception of the command (at the timing t2 in FIG. 6(A)). The data in the transmitting shift register 25 is sent out to the serial output data line 54 in synchronism with falling edges of the clock signal on the clock line 52. The monitor 81 fetches the data on the serial output data line 54 in synchronism with rising edges of the clock signal. It is to be noted that the control section 21A asserts a DTACKB signal for a period of one clock when the data in the transmitting shift register 25 is sent out. Consequently, the low level appears for a period of one clock on the signal line 53. Accordingly, the monitor 81 can recognize a delimitation of the data by monitoring the signal line 53. FIG. 6(A) shows, in addition to the DTACKB signal outputted at the timing t2, another DTACKB signal outputted in response to another RDR commend received previously and a further DTACKB signal outputted in response to a further RDR command received later.

Subsequently, real time RAM contents re-writing will be described with reference to timings and a command format shown in FIGS. 7(A) and 7(B). The first frame of the WRR command includes, for example, as seen from FIG. 7(B), command data of the twelfth to fifteenth bits and address data of the eighteenth to twenty-ninth bits. The address data includes data for designating the addresses A(2) to A(13). The second frame of the WRR command includes data to be written.

When it is tried to write data to a particular address of the RAM 2, the monitor 81 sends out a WRR command to the serial input data line 51. The WRR command is successively inputted to the receiving shift register 23 in synchronism with rising edges of the clock signal on the clock line 52. It is assumed that the first frame of the WRR command inputted then includes address data which designate the address A1 as seen in FIG. 7(A). After the command constituted from 32 bits from the monitor 81 is completely inputted to the receiving shift register 23 (at the timing t1 in FIG. 7(A)), the command data in the command are transferred to the command register 26. The control section 21A analyses the data stored in the command register 26 and discriminates that the received command is a WRR command. Consequently, the control section 21A controls so that the address data in the command may be transferred to the address register 32.

The control section 21A sets the address bus driver 33 to a passing condition so that the contents of the address register 32 may be outputted to the local address bus 11 if the RAM select signal from the CPU 103 is not significant. Further, the control section 21A renders the RAM select signal line 43 significant and supplies a RAM select signal to the RAM 2, and outputs a control signal for instruction to read out data to the system bus signal line 44. The RAM 2 outputs data at an address designated by the address data on the local address bus 11 to the local data bus 12 in response to the RAM select signal and the control signal on the system bus signal line 44. More particularly, data for 4 bytes are outputted.

The data on the local data bus 12 is inputted to the transmitting buffer register 24. The input timing is a point of time between the timing t1 and the timing t2 illustrated in FIG. 7(A). In the meantime, the second frame of the WRR is inputted from the monitor 81 to the receiving shift register 23. The data in the transmitting buffer register 24 is transferred to the transmitting shift register 25 in synchronism with completion of reception of the command, in this instance, in synchronism with completion of reception of the second frame of the WRR command (at the timing t2 illustrated in FIG. 7(A)). The data in the transmitting shift register 25 is sent out to the serial output data line 54 in synchronism with falling edges of the clock signal on the clock line 52. Data at an address whose contents are to be re-written are supplied to the monitor 81 in such a manner as described above.

After the second frame of the WRR command is inputted to the receiving shift register 23, the second frame of the WRR command is transferred from the receiving shift register 23 to the data register 34 under the control of the control section 21A. The second frame of the WRR command represents data to be written. The control section 21A sets the address bus driver 33 to a passing condition so that the contents of the address register 32 may be outputted to the local address bus 11 if the RAM select signal from the CPU 103 is not significant. Further, the control section 21A renders the RAM select signal line 43 significant and supplies a RAM select signal to the RAM 2, and outputs a control signal for instruction to write data to the system bus signal line 44. Further, the control section 21A puts the data output buffer 35 into a conducting condition. Consequently, the data in the data register 34 is outputted to the local data bus 12.

The RAM 2 writes data on the local data bus 12 to an address designated by the address data on the local address bus 11 in response to the RAM select signal and the control signal on the system bus signal line 44. The detailed data writing control of the RAM 2 is such as described hereinabove. Subsequently, the control section 21A sets the address bus driver 33 to a passing condition so that the contents of the address register 32 may be outputted to the local address bus 11 if the RAM select signal from the CPU 103 is not significant. Further, the control section 21A renders the RAM select signal line 43 significant and supplies a RAM select signal to the RAM 2, and outputs a control signal for instruction to read out data to the system bus signal line 44. The RAM 2 outputs data at an address designated by the address data on the local address bus 11 to the local data bus 12 in response to the RAM select signal and the control signal on the system bus signal line 44. More particularly, data for four bytes are outputted.

The data on the local data bus 12 is inputted to the transmitting buffer register 24. The input timing is a point of time between the timing t2 and the timing t3 illustrated in FIG. 7(A). The data in the transmitting buffer register 24 is transferred to the transmitting shift register 25 in synchronism with completion of reception of the command (at the timing t3 in FIG. 7(A)). The data in the transmitting shift register 25 is sent out to the serial output data line 54 in synchronism with falling edges of the clock signal on the clock line 52. The data written into the RAM 2 by the control section 21A is read out and transferred to the monitor 81 immediately after it is written in such a manner as described above. The monitor 81 can confirm, using the thus transferred value as a verify value, whether or not the data sent out so as to be re-written have an equal verify value. However, before data is read out from a particular address after it is written into the address by the control section 21A, the CPU 103 may possibly write data into the particular address. In this instance, the verify value may be different from the verify value of the data sent out so as to be re-written.

It is to be noted that, when the data in the transmitting shift register 25 is sent out, the control section 21A asserts a DTACKB signal only for a period of two clocks. Consequently, the low level appears for a period of two clocks on the signal line 53. Accordingly, the monitor 81 can recognize a delimitation of the data outputted in response to the WRR command by monitoring the signal line 53. FIG. 7(A) shows, in addition to the DTACKB signals outputted at the timings t2 and t3, another DTACKB signal outputted in response to another WRR command received previously and a further DTACKB signal outputted in response to a further WRR command received later.

Subsequently, emROM contents outputting will be described with reference to timings and a command format illustrated in FIGS. 8(A) and 8(B). The RDE command includes, for example, as seen in FIG. 8(B), command data of the twelfth to fifteenth bits and address data of the eighteenth to twenty-ninth bits. The address data include data for designating the addresses A(2) to A(13).

When data at a particular address of an emROM which is not being used by the CPU 103 at present is to be read out to the external monitor system side, the monitor 81 sends out an RDE command to the serial input data line 51. As described hereinabove, the CPU 103 can access only one of the first emROM 61 and the second emROM 62. Consequently, the RTD 1A can freely access the emROm which is not being accessed by the CPU 103. The RDE command is successively inputted to the receiving shift register 23. It is assumed that the RDE command inputted in this instance includes address data which designate the address A1 as seen in FIG. 8(A). After the command constituted from 32 bits from the monitor 81 is completely inputted to the receiving shift register 23 (at the timing t1 in FIG. 8(A)), the command data in the command are transferred to the command register 26. The control section 21A analyses the data stored in the command register 26 and determines that the received command is an RDE command. Consequently, the control section 21A controls so that the address data in the command may be transferred to the address register 32.

The control section 21A sets the address bus driver 33 to a passing condition. The control section 21A can discriminate, from the emROM selection condition bit in the emROM status register 82, which one of the emROMs is being used by the CPU 103. The control section 21A outputs an emROM select signal to one of the first emROM select signal line 71 and the first emROM select signal line 72 which corresponds to the emROM which is not being used by the CPU 103 at present. Further, the control section 21A outputs a control signal for instruction to read out data to the system bus signal line 44. The first emROM 61 or the second emROM 62 outputs data at an address designated by the address data on the local address bus 11 to the local data bus 12 in response to the emROM select signal and the control signal on the system bus signal line 44. More particularly, data for addresses beginning with the address designated by the address data are outputted. In other words, data for four bytes are outputted.

The data on the local data bus 12 is inputted to the transmitting buffer register 24. The input timing is a point of time between the timings t1 and t2 illustrated in FIG. 8(A). It is to be noted that, in FIG. 8(A), it is shown that another RDE command including address data which designate the address A2 is sent out from the monitor 81 subsequently to the RDE command including the address data designating the address A1.

The data in the transmitting buffer register 24 is transferred to the transmitting shift register 25 in synchronism with completion of reception of the command (at the timing t2 in FIG. 8(A)). The data in the transmitting shift register 25 is sent out to the serial output data line 54 in synchronism with falling edges of the clock signal on the clock line 52. The monitor 81 fetches the data on the serial output data line 54 in synchronism with rising edges of the clock signal. It is to be noted that the control section 21A asserts a DTACKB signal only for a period of one clock when the data in the transmitting shift register 25 is outputted. Consequently, the low level appears only for a period of one clock on the signal line 53. Accordingly, the monitor 81 can recognize a delimitation of the data transferred in response to the command to output the memory contents by monitoring the signal line 53. FIG. 8(A) shows, in addition to the DTACKB signal outputted at the timing t2, another DTACKB signal outputted in response to another RDE command received previously and a further DTACKB signal outputted in response to a further RDE command received later.

It is to be noted that, when the CPU 103 tries to read out data of the first emROM 61 or the second emROM 62, it outputs address data to the address bus 4 and outputs an emROM select signal to the emROM select signal line 45, and outputs a control signal for an instruction to read out to the system bus signal line 6. The RTD 1A outputs an emROM select signal to one of the first emROM select signal line 72 and the second emROM select signal line 74 which corresponds to the emROM which is being used by the CPU 103 at present. The control signal for instruction to read out is outputted to the system bus signal line 44 extending from the RTD 1A. The first emROM 61 or the second emROM 62 outputs data at an address designated by the address data on the address bus 4 to the data bus 5 in response to the emROM select signal and the control signal on the system bus signal line 44.

Subsequently, emROM contents re-writing will be described with reference to timings and a command format illustrated in FIGS. 9(A) and 9(B). The first frame of the WRE command includes, for example, as seen in FIG. 9(B), command data of the twelfth to fifteenth bits and address data of the eighteenth to twenty-ninth bits. The address data include data for designating the addresses A(2) to A(13). The second frame of the WRE command includes data to be written.

When data is to be written into a particular address of the first emROM 61 or the second emROM 62, the monitor 81 sends out a WRE command to the serial input data line 51. The WRE command is successively inputted to the receiving shift register 23. It is assumed that the first frame of the WRE command inputted in this instance includes address data which designate the address A1 as seen in FIG. 9(A). After the command constituted from 32 bits from the monitor 81 is completely inputted to the receiving shift register 23 (at the timing t1 in FIG. 9(A)), the command data in the command are transferred to the command register 26. The control section 21A analyses the data stored in the command register 26 and determines that the received command is a WRE command. Consequently, the control section 21A controls so that the address data in the command may be transferred to the address register 32.

The control section 21A sets the address bus driver 33 to a passing condition so that the contents of the address register 32 may be outputted to the local address bus 11. Further, the control section 21A outputs an emROM select signal to one of the first emROM select signal line 71 and the second emROM select signal line 73 which corresponds to the emROM which is not being used by the CPU 103 at present. Further, the control section 21A outputs a control signal for instruction to read out data to the system bus signal line 44. The first emROM 61 or the second emROM 62 outputs data at an address designated by the data address on the local address bus 11 to the local data bus 12 in response to the emROM select signal and the 0control signal on the system bus signal line 44. More particularly, data for four bytes are outputted.

The data on the local data bus 12 is inputted to the transmitting buffer register 24. The input timing is a point of time between the timings t1 and t2 illustrated in FIG. 9(A). In the meantime, the second frame of the WRE command is inputted from the monitor 81 to the receiving shift register 23. The data in the transmitting buffer register 24 is transferred to the transmitting shift register 25 in synchronism with completion of reception of the command, in this instance, in synchronism with completion of reception of the second frame of the WRE command (at the timing t2 in FIG. 9(A)). The data in the transmitting shift register 25 is sent out to the serial output data line 54. The data before re-writing at the address whose contents are to be re-written are supplied to the monitor 81 in such a manner as described above.

After the second frame of the WRE command is inputted to the receiving shift register 23, the second frame of the WRE command is transferred from the receiving shift register 23 to the data register 34 under the control of the control section 21A. The second frame of the WRE command indicates data to be written. The control section 21A sends the address bus driver 33 to a passing condition so that the contents of the address register 32 may be outputted to the local address bus 11. Further, the control section 21A supplies an emROM select signal to the first emROM select signal line 71 or the first emROM select signal line 72 and outputs a control signal for instruction to write data to the system bus signal line 44. Further, the control section 21A puts the data output buffer 35 into a conducting condition. Consequently, the data in the data register 34 is outputted to the local data bus 12.

The first emROM 61 or the second emROM 62 writes the data on the local data bus 12 to an address designated by the address data on the local address bus 11 in response to the emROM select signal and the control signal on the system bus signal line 44. Subsequently, the control section 21A sets the address bus driver 33 to a passing condition so that the contents of the address register 32 may be outputted to the local address bus 11. Further, the control section 21A supplies an emROM select signal to the first emROM select signal line 71 or the second emROM select signal line 73 and outputs a control signal for instruction to read out data to the system bus signal line 44. The first emROM 61 or the second emROM 62 outputs data at an address designated by the address data on the local address bus 11 to the local data bus 12 in response to the emROM select signal and the control signal on the system bus signal line 44. More particularly, data for four bytes are outputted.

The data on the local data bus 12 is inputted to the transmitting buffer register 24. The input timing is a point of time between the timings t2 and t3 illustrated in FIG. 9(A). The data in the transmitting buffer register 24 is transferred to the transmitting shift register 25 in synchronism with completion of reception of the command (at the timing t3 in FIG. 9(A)). The data in the transmitting shift register 25 is sent out to the serial output data line 54 in synchronism with falling edges of the clock signal on the clock line 52. The data written in the first emROM 61 or the second emROM 62 by the control section 21A is read out and transferred to the monitor 81 immediately after it is written in such a manner as described above. The monitor 81 can confirm, using the thus transferred value as a verify value, whether or not the verify value is equal to that of the data sent out for re-writing.

It is to be noted that, when the data in the transmitting shift register 25 is sent out, the control section 21A asserts a DTACKB signal only for a period of three clocks. Consequently, the low level appears for a period of three clocks on the signal line 53. Accordingly, the monitor 81 can recognize a delimitation of the data outputted in response to a WRE command by monitoring the signal line 53. FIG. 9(A) shows, in addition to the DTACKB signals outputted at the timings t2 and t3, another DTACKB signal outputted in response to another WRE command received previously and a further DTACKB signal outputted in response to a further WRE command received later.

Subsequently, continued monitoring will be described with reference to timings and a command format illustrated in FIGS. 10(A) and 10(B). The VER command has, for example, as illustrated in FIG. 10(B), a command portion of the twelfth to fifteenth bits.

When data at a particular address of the RAM 2, the first emROM 61 or the second emROM 62 are to be successively read out to the external monitor system side, the monitor 81 sends out a VER command to the serial input data line 51. The VER command is successively inputted to the receiving shift register 23. After the command constituted from 32 bits from the monitor 81 is completely inputted to the receiving shift register 23 (at the timing t1 in FIG. 10(A)), the command data in the command are transferred to the command register 26. The control section 21A analyses the data stored in the command register 26 and determines that the received command is a VER command.

If another command received immediately prior to then is an RDR command or a WRR command, address data designating a particular address of the RAM 2 included in the command is stored in the address register 32 then. If another command received immediately prior to then is an RDE command or a WRE command, address data designating a particular address of the first emROM 61 or the second emROM 62 included in the address is stored in the address register 32 then. In FIG. 10(A), it is illustrated that an RDR command has been received immediately prior to then, for example.

When the command received immediately prior to then is an RDR command or a WRR command, the control section 21A sets the address bus driver 33 to a passing condition if the RAM select signal from the CPU 103 is not significant. Consequently, the contents of the address register 32 are outputted to the local address bus 11. Further, the control section 21A renders the RAM select signal line 43 significant and supplies a RAM select signal to the RAM 2, and outputs a control signal for instruction to read out data to the system bus signal line 44. The RAM 2 outputs data at an address designated by the address data on the local address bus 11 to the local data bus 12 in response to the RAM select signal and the control signal on the system bus signal line 44. More particularly, data for four bytes are outputted. The data on the local data bus 12 is inputted to the transmitting buffer register 24. The input timing is a point of time between the timings t1 and t2 illustrated in FIG. 10(A).

The data in the transmitting buffer register 24 is transferred to the transmitting shift register 25 in synchronism with completion of reception of the command (at the timing t2 in FIG. 10(A)) The data in the transmitting shift register 25 is sent out to the serial output data line 54. The monitor 81 fetches the data on the serial output data line 54 in synchronism with rising edges of the clock signal. It is to be noted that the control section 21A asserts a DTACKB signal only for a period of one clock when the data in the transmitting shift register 25 are sent out. Consequently, the low level appears only for a period of one clock on the signal line 53. Accordingly, the monitor 81 can recognize a delimitation of the data by monitoring the signal line 53.

When the command received immediately prior to then is an RDE command or a WRE command, the control section 21A sets the address bus driver 33 to a passing condition and outputs an emROM select signal to that one of the emROMs which is not being used by the CPU 103 at present by way of the first emROM select signal line 71 or the second emROM select signal line 73. Further, the control section 21A outputs a control signal for instruction to read out data to the system bus signal line 44. The first emROM 61 or the second emROM 62 outputs data at an address designated by the address data on the local address bus 11 to the local data bus 12 in response to the emROM select signal and the control signal on the system bus signal line 44. More particularly, data for four bytes are outputted. The operation after then is similar to that when the command received immediately prior is an RDR command or a WRR command.

When the monitor 81 tries to get data at a particular address of the RAM 2, the first emROM 61 or the second emROM 62, it successively sends out a VER command to the RTD 1A. The RTD 1A repeats the operation described above in response to successive receptions of the VER command. The monitor 81 can successively get data at the same address. Accordingly, when the CPU 103 re-writes data at a particular address of the RAM 2, the first emROM 61 or the second emROM 62, the point of time at which such re-writing occurs and re-written data can be recognized immediately.

Figure 11A:
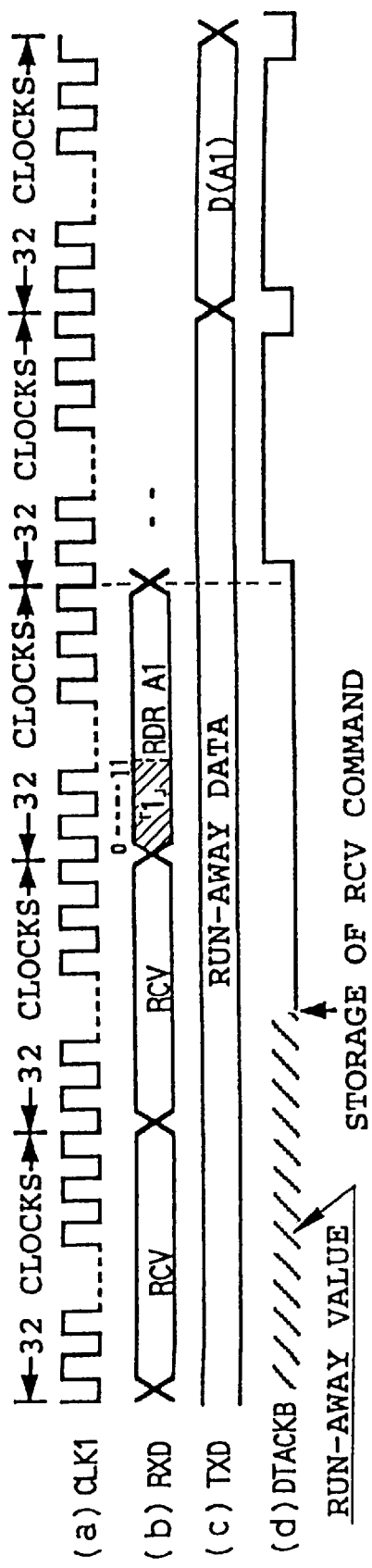
FIG. 11(A) is a time chart illustrating a signal outputting timing upon recovery from a run-away condition.
Figure 11B:
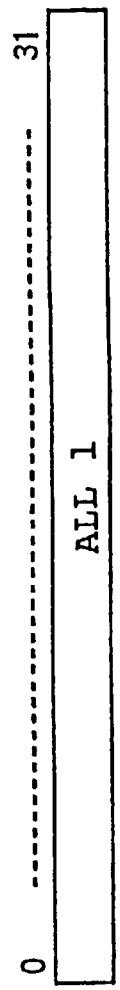
FIG. 11(B) is a format diagram illustrating an RCV command.

Subsequently, recovery from a run-away condition will be described with reference to timings and a command format illustrated in FIGS. 11(A) and 11(B). The monitor 81 can recognize a run-away condition of the RTD 1A, for example, from a defect of a DTACKB signal. The DTACKB signal is originally kept at the low level for a period of one to three clocks each time the RTD 1A sends out data of 32 bits. If the timing at which a DTACKB signal is outputted is different from an original timing at which a DTACKB signal should be outputted, then the monitor 81 recognizes that the RTD 1A is in a run-away condition. Or, if the monitor 81 detects that a DTACKB signal which should originally keep the low level for a period of one clock exhibits the low level for a period of a plurality of clocks, it recognizes that the RTD 1A is in a run-away condition. Or else, if data outputted to the serial output data line 54 are different by a great amount from an estimated value, the monitor 81 recognizes that the RTD 1A is in a run-away condition.

A run-away condition of the RTD 1A occurs very likely when noise is originated in the serial input data line 51 or the serial output data line 54. When noise is originated in the serial input data line 51 or the serial output data line 54, a bit shift occurs with a command received by the RTD 1A. In this instance, the RTD 1A possibly recognizes that it has received a command different from the command sent out from the monitor 81. Then, the RTD 1A may operate in accordance with the different command and respond to the monitor 81 in a different manner from that in which it should respond. In such a case, a DTACKB signal which originally should exhibit the low level for a period of one clock may exhibit the low level for a period of a plurality of clocks or data outputted to the serial output data line 54 may be different by a great amount from an estimated value. In such a case, although the RTD 1A is operating in accordance with a wrong command, the operation itself is normal. Accordingly, if a command for recovering an operation condition is supplied to the RTD 1A, then the RTD 1A very possibly recovers an operation conforming to a demand from the monitor 81.

When a run-away condition of the RTD 1A is detected, the monitor 81 sends out an RCV command to the RTD 1A. The RCV command has the value of "1" at all of the bits thereof as seen in FIG. 11(B). Further, the monitor 81 successively sends out the RCV command twice. After the command constituted from 32 bits from the monitor 81 is completely inputted to the receiving shift register 23, the command portion in the command is transferred to the command register 26. The control section 21A analyzes the data stored in the command register 26 and discriminates that the received command is an RCV command. Since the RCV command has the value of "1" at all of the bits thereof and besides is outputted twice successively, even if a command received before the RCV command is sent out suffers from a bit shift, the data of "1111" are stored into the command register 26 without fail. It is to be noted that, in order to make recovery of the RTD 1A sure, the monitor 81 changes the 0th to eleventh bits of any command, which is to be sent out next to the second RCV command and is different from the RCV command, to "1."

If it is detected that "1111" have been stored into the command register 26, the control section 21A thereafter waits reception of a command other than an RCV command. More particularly, the control section 21A waits that "0" appears at the twelfth bit of the receiving shift register 23. In the present embodiment, since the twelfth bit of any command other than the RCV command is "0,"0 when "0" appears at the twelfth bit of the receiving shift register 23, this signifies that a command free from a bit shift has been stored into the receiving shift register 23. Consequently, at this point of time, the synchronism between the operation of the RTD 1A and the operation of the monitor 81 is established again. In other words, from the standpoint of the monitor 81, the run-away condition of the RTD 1A has been dissolved.

The RTD 1A sends out a DTACKB signal which has the low level for a period of four or more clocks to the monitor 81. In the example shown in FIG. 11(B), the RTD 1A raises the DTACKB signal to the high level upon completion of reception of a command next to the RCV command. Further, the monitor 81 can recognize, by detecting that the DTACKB signal has kept the low level for a period of four or more clocks and then raises the level to the high level, that the RTD 1A has been recovered. In such a manner as described above, when synchronism between the operation of the RTD 1A and the operation of the monitor 81 is lost, even if a reset signal is not supplied to the CPU 103, the RTD 1A can be recovered into a synchronized condition. It is to be noted that, if a reset signal is supplied to the CPU 103, it is applied to the RTD 1A by way of the reset signal line 41. The RTD 1A returns to its initial condition when the reset signal is supplied thereto.

It is to be noted that, while it is described herein that the rcv command having the value of "1" at all of the bits thereof is used, another rcv command which has the value of "0" at all of the bits thereof may otherwise be used whereas the twelfth bit of any other command than the rcv command is set to "1."

What is claimed is:

1. A microcomputer, comprising:
   a CPU for performing processing in accordance with a program;
   a RAM for storing data to be used by said CPU, said CPU switching itself, under its own control, to one of a first state characterized by suspension of access to the RAM and a second state characterized by access to the RAM; and
   a real time debugger for reading out, when a read address of said RAM is received from the outside, data in said RAM whenever said real time debugger detects that said CPU is in said first state and outputting the read out data to the outside, without placing said CPU in a hold state or causing said microcomputer to enter a special state reserved for debugging.

2. A microcomputer according to claim 1, wherein said real time debugger includes:

a plurality of address registers for storing address data designating addresses of said RAM supplied from the outside; and
   an address pointer for designating one of said address registers which corresponds to address data provided to said RAM.

3. A microcomputer according to claim 2, further comprising:
   a local address bus provided between said real time debugger and said RAM;
   a local data bus provided between said RAM and said real time debugger;
   a switch for connecting said plurality of address registers of said real time debugger to said local address bus; and
   a switch for disconnecting an address bus of said CPU from said RAM.

4. A microcomputer according to claim 2, wherein said real time debugger further includes:
   a control section for receiving a command including command data designating an operation condition of said real time debugger and address data designating a read address and performing an operation in accordance with the received command.

5. A microcomputer according to claim 2, wherein said real time debugger outputs a signal representing that data outputted to the outside is significant.

6. A microcomputer according to claim 1, further comprising:
   a reset signal line for transmitting a reset signal from the outside to said real time debugger; and
   another reset signal line for transmitting a reset signal from said CPU to said real time debugger.

7. A microcomputer according to claim 1, wherein said real time debugger includes a status register for setting a status of an interruption request in said CPU and outputs contents of said status register to the outside.

8. A microcomputer according to claim 1, wherein said real time debugger includes a counter for counting internal clocks of said CPU and outputs contents of said counter.

9. A microcomputer according to claim 1, wherein said real time debugger writes data into said RAM in response to a request from the outside when said CPU is not accessing said RAM.

10. A microcomputer according to claim 9, further comprising:
    a pair of emulation ROMs having a same address space and accessible from said CPU only to read out data but accessible from said real time debugger to read out and write data; and wherein
    said real time debugger accesses, in response to a request from the outside, that one of said emulation ROMs which is not being used by said CPU.

11. A microcomputer according to claim 9, further comprising:
    a local address bus provided between said real time debugger and said RAM;
    a local data bus provided between said RAM and said real time debugger;
    switches provided between said RAM and said local address bus and between said RAM and said local data bus;
    switches provided between said RAM and an address bus of said CPU and between said RAM and a data bus of said CPU;
    a buffer for outputting data in said RAM to said local data bus; and another buffer for outputting data in said RAM to said data bus of said CPU.

12. A microcomputer according to claim 9, wherein said real time debugger includes a control section for receiving a command including command data designating an operation condition of said real time debugger and address data designating a read address and performing an operation in accordance with the received command.

13. A microcomputer according to claim 9, wherein said real time debugger outputs, upon starting of sending out of data to be outputted to the outside, a signal having a pulse width corresponding to a command by which the data are requested.

14. A microcomputer according to claim 9, further comprising a reset signal line for transmitting a reset signal from said CPU to said real time debugger.

15. A microcomputer, comprising:
a CPU for performing processing in accordance with a program;
a RAM for storing data to be used by said CPU, said CPU switching itself, under its own control, to one of a first state characterized by suspension of access to the RAM and a second state characterized by access to the RAM;
a first internal bus that provides communication between the CPU and the RAM;
a second internal bus, bypassing the CPU, that provides communication with the RAM; and
a real time debugger for reading out, when a read address of said RAM is received from outside the microcomputer, data in said RAM via the second internal bus at a time when said real time debugger detects that said CPU is in said first state and outputting the read out data outside the microcomputer, without placing said CPU in a hold state or causing said microcomputer to enter a special state reserved for debugging.

16. The microcomputer according to claim 15, wherein said real time debugger includes:
a plurality of address registers for storing address data designating addresses of said RAM supplied from outside the microcomputer; and
an address pointer for designating one of said address registers which corresponds to address data provided to said RAM.

17. A microcomputer according to claim 15, wherein said real time debugger writes data into said RAM in response to a request from the outside only when said CPU is not accessing said RAM.

18. A microcomputer according to claim 15, further comprising:
a pair of emulating ROMs having a same address space and accessible from said CPU only to read out data but accessible from said real time debugger to read out and write data; and
wherein said real time debugger accesses, in response to a request from outside the microcomputer, only that one of said emulation ROMs which is not being used by said CPU.

19. A microcomputer, comprising:
a CPU for performing processing in accordance with a program;
a RAM for storing data to be used by said CPU, said CPU switching itself, under its own control, to one of a first state characterized by suspension of access to the RAM and a second state characterized by access to the RAM; and
a real time debugger for reading out, when a read address of said RAM is received from outside the microcomputer, data in said RAM at a time when said real time debugger detects that said CPU is in said first state by using a switch that selectively provides one of the CPU and the real time debugger access to said RAM, and outputting the read out data outside the microcomputer, without placing said CPU in a hold state or causing said microcomputer to enter a special state reserved for debugging.

20. A microcomputer, comprising:
a CPU for performing processing in accordance with a program;
a RAM for storing data to be used by said CPU; and
a real time debugger for reading out, when a read address of said RAM is received from the outside, data in said RAM whenever said CPU does not access said RAM and outputting the read out data to the outside,
wherein said real time debugger writes data into said RAM in response to a request from the outside when said CPU is not accessing said RAM, and said real time debugger includes a control section for receiving a command including command data designating an operation condition of said real time debugger and address data designating a read address and performing an operation in accordance with the received command.

21. A microcomputer according to claim 20, wherein said control section detects, when a recovery command constituted from bits all having an equal value is received, a bit in a command received subsequently to the return command which has a value different from the value of the bits constituting the recovery command, and re-establishes synchronism of a command to be received.

22. A microcomputer, comprising:
a CPU for performing processing in accordance with a program;
a RAM for storing data to be used by said CPU; and
a real time debugger for reading out, when a read address of said RAM is received from the outside, data in said RAM whenever said CPU does not access said RAM and outputting the read out data to the outside,
wherein said real time debugger writes data into said RAM in response to a request from the outside when said CPU is not accessing said RAM, and said real time debugger outputs, upon starting of sending out of data to be outputted to the outside, a signal having a pulse width corresponding to a command by which the data are requested.

* * * * *